3,426,739
MAXIMUM-MINIMUM GOVERNOR WITH TORQUE SPRING FOR IMPROVING ENGINE PERFORMANCE DURING OVERLOADING
John M. Bailey, Dunlap, and Marvin A. Gates, Chillicothe, Ill., assignors to Caterpillar Tractor Co., Peoria, Ill., a corporation of California
Filed Aug. 3, 1967, Ser. No. 658,114
U.S. Cl. 123—140                                            4 Claims
Int. Cl. F02d 1/04

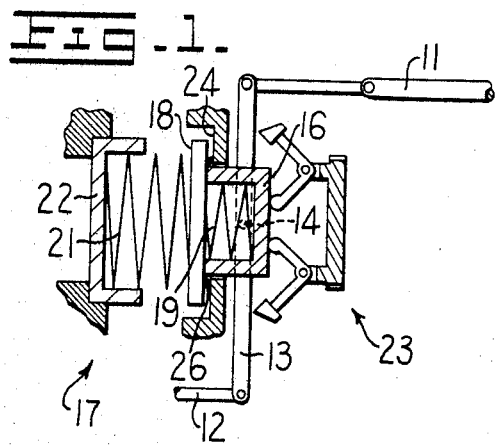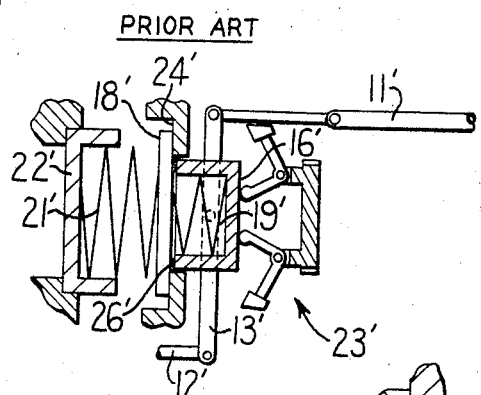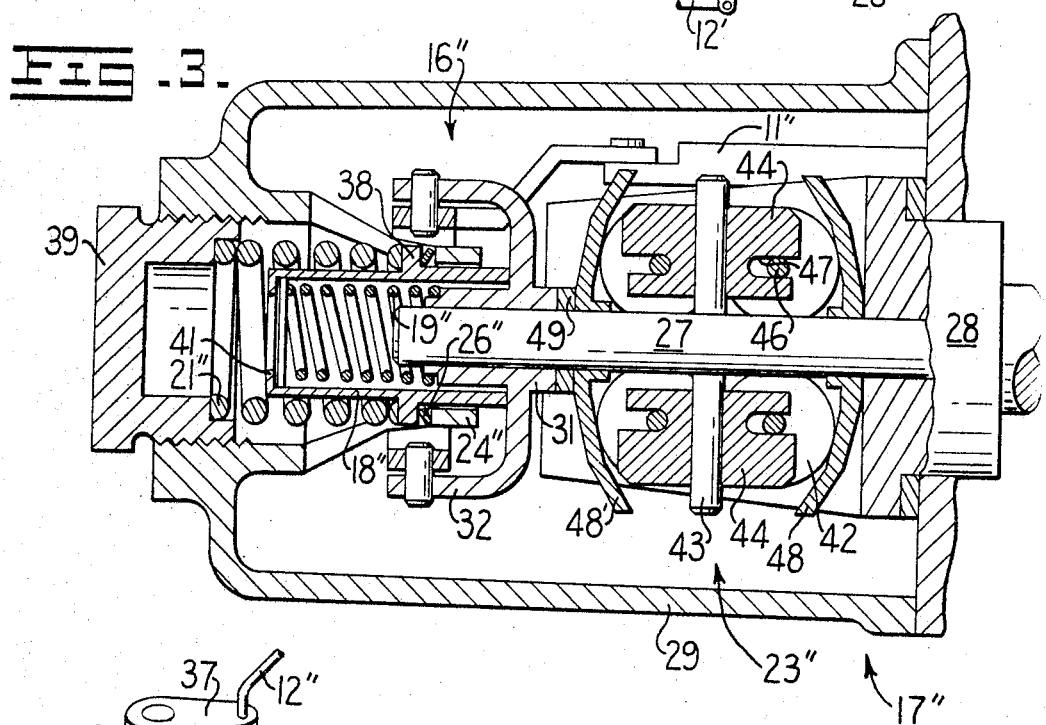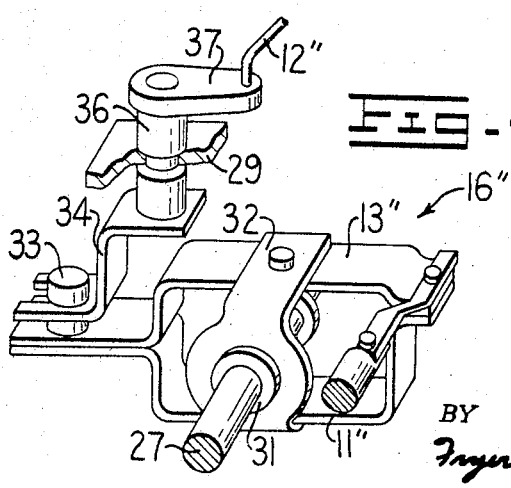
Fig. 2. PRIOR ART
INVENTORS
JOHN M. BAILEY
MARVIN A. GATES
ATTORNEYS United States Patent Office                                    3,426,739
                                                          Patented Feb. 11, 1969

ABSTRACT OF THE DISCLOSURE

A maximum-minimum governor has a torque spring establishing a full load governed speed well below the maximum torque capacity of the associated engine whereby torque increases as engine speed decreases during an overload. Owing to a unique positioning relative to the other governor elements, the torque spring is only lightly loaded while the engine operates at rated speed thereby providing for greater durability and less maintenance problems.

Cross-reference to related application

The invention is described herein as embodied in an engine governor of the general type disclosed and claimed in co-pending application 647,098 of John M. Bailey et al. for Engine Governor, filed June 19, 1967.

Background of the invention

This invention relates to engines and more particularly to maximum-minimum governor mechanisms which may be used therewith for maintaining engine speed within a predetermined range.

Engines of the type which power trucks, tractors and various forms of earth-moving equipment, for example, are usually designed to operate at a specific rated speed under full load conditions. Difficulties are encountered if the load increases while the engine is operating at full load and rated speed. In the absence of corrective measures, the engine lugs or rapidly loses speed in this situation and may stall unless the operator quickly takes steps to relieve the overload or shifts down to a lower gear setting. To improve engine performance under these conditions, the governor which regulates the engine speed may be provided with a torque spring.

A torque spring modifies the basic governor mechanism to establish a rated speed at full load which is greater than the speed at which the engine delivers maximum torque and which is well down on the torque curve of the engine. Thus as the engine begins to lug under an overload, torque rises. This may prevent stalling in some cases and in more severe situations acts to delay stalling for a time sufficient to enable the operator to take corrective measures.

While torque springs have heretofore been used in maximum-minimum governors, the relationship of the torque spring relative to the other governor elements in the prior constructions has caused the spring to be most heavily loaded when the engine is opreating at full speed under full load conditions. Consequently, wearing and deterioration of the torque spring is aggravated. This is h'ghly undesirable in that engine performance is adversely affected and maintenance requirements are complicated.

Summary of the invention

This invention provides for a novel structural relationship between a torque spring and other elements of a maximum-minimum governor in which the torque spring need only be lightly loaded, if at all, while the engine is operating under full load at rated speed.

Accordingly it is an object of this invention to provide for improved engine performance in powered vehicles and the like and, more specifically, to provide a maximum-minimum governor of the class having a torque spring which is more durable, more reliable and which requires less maintenance operations.

The invention, together with further objects and advantages thereof, will best be understood by reference to the following description of preferred embodiments in conjunction with the accompanying drawings.

Brief description of the drawings

In the accompanying drawings:
FIG. 1 is a schematic representation of the basic elements of a maximum-minimum governor having the present invention embodied therein;
FIG. 2 is a schematic representation of a maximum-minimum governor corresponding to FIG. 1 illustrating the conventional disposition of a torque spring therein;
FIG. 3 is an axial section view showing the detailed construction of one form of maximum-minimum governor embodying the present invention; and
FIG. 4 is a perspective view showing the manner in which an operator's speed control linkage couples to the governor mechanism of FIG. 3.

Description of preferred embodiments

Referring now to the drawing, FIG. 1 shows the basic elements of a maximum-minimum governor in diagrammatic form in order to facilitate an understanding of the novel relationship of the torque spring thereto. It should be understood that the several illustrated elements may take a variety of physical forms in different governors and may have varied placements relative to each other, one example of the detailed construction of such a governor being hereinafter described.

In many engines, such as the diesel engines used to power many trucks, engine speed for a given loading is determined by the amount of fuel metered into the engine and this is in turn controlled by a movable rack 11 or the like. The operator's speed control linkage 12 may be pivoted to one end of a lever 13 while the rack 11 is pivoted to the other end thereof. A pivot 14 connects the center portion of the lever 13 to a fuel control element 16 of the governor 17. Thus in the absence of movement of the governor fuel control element 16, any longitudinal adjustment of the operator's linkage 12 is transmitted to rack 11 through lever 13 to vary the amount of fuel supplied to the engine. The maximum-minimum governor 17 functions to shift the lever 13 independently of the operator's control linkage 12 to prevent the engine from decelerating below a predetermined minimum speed or from exceeding a predetermined maximum speed. In between these limits the engine speed is fully controlled by the operator except as modified by torque spring action under overload conditions as will hereinafter be discussed.

Components which shift fuel control element 16 in order to effect the maximum-minimum governing action include a second movable member 18 and an idle spring 19 which exerts a force tending to urge the fuel control element and movable member 18 apart. A maximum speed spring 21 acts between member 18 and a fixed element 22 to exert another force against member 18 which is substantially greater than the force of idle spring 19 and which is opposed thereto. Still another force is exerted against fuel control element 16 by a flyweight mechanism 23. Flyweight mechanism 23 is coupled to the associated engine in the conventional manner and centrifugally generates a variable force which is a function of engine speed and which is directed against control element 16 in opposition to the force of both idle spring 19 and maximum speed spring 21 thereon. A fixed stop 24 limits the travel of movable member 18 in response to the force of maximum speed spring 21 and is positioned to establish the maximum fuel injection rate as will hereinafter be discussed in greater detail.

In operation, a minimum (idling) speed is automatically established through the action of idle spring 19 on control element 16 and the variable counterforce exerted thereon by flyweight mechanism 23. Below idling speed, spring 19 moves element 16 and rack 11 to the position of maximum fuel injection. As the engine reaches idling speed the increasing counterforce exerted by the flyweights 23 becomes sufficient to overcome the force of idle spring 19 and moves the rack 11 back to the position needed to supply an amount of fuel adequate only for maintaining minimum speed. If engine speed decreases by an incremental amount, the force exerted by flyweight mechanism 23 also decreases and idle spring 19 moves the control element 16 to restore the minimum speed. At this stage the movable member 18 remains at its maximum limit of travel towards stop 24 under the action of the strong maximum speed spring 21.

When the engine reaches rated speed, the force exerted on control element 16 by the flyweight mechanism 23 becomes sufficient to move element 16 and member 18 against the action of the maximum speed spring 21. When this occurs no further speed increase can be obtained either by manipulation of the operator's control linkage 12 or through a decrease in the loading of the associated engine. An incremental speed increase is automatically counteracted in that the force exerted by flyweight mechanism 23 also increases to stabilize the engine at rated speed.

The operation of the governor 17 as described to this point corresponds to that of a conventional maximum-minimum governor without a torque spring and in the absence of such a spring the governor would be subject to the hereinbefore discussed difficulties when an overload is experienced while operating at rated speed. In particular, the full load rated speed established by such a governor corresponds to a torque capacity which may be very close to the maximum torque which the associated engine is capable of delivering. In diesel engines, for example, torque is proportional to the quantity of fuel injected at each operation of the fuel pumps. Thus the maximum torque is obtained when the rack 11 is at its extreme position. This rack position is in turn fixed by the location of the stop 24 of the governor 17. Since the maximum speed governing action occurs after member 18 has moved away from stop 24 by only a small amount, the rated speed is in effect very close to the maximum torque point. Consequently a very small speed reduction resulting from an overload causes the member 18 to re-seat against stop 24 and thereafter the torque output of the engine can only decrease as the speed decrease continues. This condition can result in rapid stalling unless corrective measures such as relieving the overload or down-shifting are taken very promptly. As a practical matter, stalling may occur too rapidly for the operator to remedy the situation.

To establish a rated speed at full load which is well below the maximum torque point, the present invention employs a torque spring 26 situated between member 18 and stop 24. The governor 17 then operates essentially as hereinbefore described at idling speeds and at the intermediate speeds wherein the rack 11 is controlled by the operator through linkage 12. At these stages the torque spring 26 remains compressed between member 18 and stop 24 because of the greater force exerted against member 18 by the maximum speed spring 21. However, at the upper end of the speed range torque spring 26 functions to fix the rated speed at a point well below the maximum torque capacity of the associated engine.

In structural terms, the torque spring 26 causes the member 18 to retract a substantial distance from stop 24 at the maximum governed speed. Accordingly, the member 18 is capable of moving a substantial distance towards stop 24 in response to an overload induced engine deceleration and may thereby move the rack 11 to provide a sizable torque increase at such time. Thus as the engine is approaching its maximum governed speed and the force exerted on control element 16 by flyweight mechanism 23 is increasing, element 16 and member 18 move against the force of maximum spring 21 before this would occur in the absence of the torque spring 26 since the force of the torque spring supplements that of the flyweight mechanism to produce such movement. This provides for the desired reserve torque capacity to cope with overloads as hereinbefore described.

The disposition of the torque spring 26 to act between movable member 18 and stop 24 has a very desirable result. Under the normal operating condition at full load and rated speed, the torque spring is relaxed or very lightly loaded. Wearing and loss of resiliency is minimized. This is particularly important since the spring 26 is a very sensitive determinant of the rated speed of the engine. This effect is not obtained in the conventional maximum-minimum governor having torque spring, the conventional structure being illustrated in FIG. 2 wherein the basic elements of the governor are identified by prime numbers corresponding to those in FIG. 1. In the conventional arrangement, the torque spring 26' acts between the fuel control element 16' and movable member 18' to produce an effect similar to that of the arrangement shown in FIG. 1 insofar as regulation of engine speed is concerned. However in the arrangement of FIG. 2, the torque spring 26' is compressed or fully loaded at the rated engine speed.

Referring now to FIG. 3, an example of the application of the invention to a specific governor mechanism 17" is shown. The governor 17" is of the general type described in the hereinbefore identified co-pending application Ser. No. 647,098 and includes elements which are functionally equivalent to those described with reference to FIG. 1 although differing therefrom in physical configuration and placement.

Salient features of this form of governor 17" include a drive shaft 27 which may be an extension of an engine camshaft 28 and which projects into a housing 29. Referring now to FIG. 4 in conjunction with FIG. 3, the fuel control element 16" is a yoke comprised of a sleeve 31 slidable along drive shaft 27 and having a pair of arms 32 pivoted to the central portion of a lever assembly 13". The rack 11" which regulates fuel injection is pivoted to one end of lever assembly 13" and the operator's speed control linkage 12" is coupled to the opposite end of the lever assembly through a pivot 33. An angled arm 34 couples pivot 33 to the operator's linkage through a rotatable pin 36 which is journalled in the governor housing 29 and carries a crank arm 37. Thus axial movement of the operator's linkage 12" adjusts the setting of the control rack 11" by pivoting lever assembly 13" except insofar as the motion may be offset by the compensating movement of the fuel control element 16" as will hereinafter be described.

The second movable member in governor 17" is a cylinder 18" disposed at the end of drive shaft 27 and having a flange 38 against which a maximum speed compression spring 21" bears. The opposite end of spring 21" reacts against an adjustable end cap 39 engaged in the governor housing 29 so that the spring exerts a force on member 18" directed towards fuel control element 16". The idle spring 19" is a compression spring disposed within member 18" and which reacts against sleeve 31 and an inwardly directed lip 41 at the opposite end of member 18".

The flyweight mechanism 23" is comprised of rollers 42 which turn with the drive shaft 27 and which may move outward therefrom in response to centrifugal force. To retain the rollers, a pin 43 transacts the drive shaft 27 and a carrier block 44 is disposed on the pin at each side of the shaft with the carrier blocks being slidable along the pin in a radial direction with respect to the shaft. A pair of the roller flyweights 42 are retained by each of the carrier blocks 44 with a reduced diameter central section 46 of each roller being entered into a slot 47 of the carrier block so that each roller may turn relative to the associated carrier and may move in a direction parallel to drive shaft 27 within the carrier slot 47.

Rollers 42 react against a pair of ramp members 48 which are disposed on the drive shaft 27 with one ramp member being at each of the assembly formed by the rollers 42 and carriers 44. Ramp members 48 are convergent whereby outward movement of rollers 42 in response to increasing centrifugal force causes one of the ramps 48' to move axially along shaft 27 and bear against fuel control element 16" through a thrust bearing 49 in a direction tending to reduce fuel injection.

The fixed stop 24" which limits travel of movable member 18" is an annulus which is coaxial with member 18" and which may be formed as an integral part of the governor housing 29. The torque spring 26" is of the type having a dished annular configuration, commonly known as a Bellville spring, and is disposed in coaxial relationship to stop 24" and adjacent thereto in position to be contacted by flange 38.

Governor 17" operates in a manner essentially similar to that of the structure described with reference of FIG. 1. Thus when the engine is operating at idling speed the torque spring 26" is compressed against stop 24" by the force of the maximum speed spring 21". At this time idle spring 19" tends to drive fuel control element 16" in a direction which would increase the rate of fuel injection. However this force is balanced by the opposing force exerted on control element 16" by the roller flyweights 42 acting through ramp 48' so that a balanced condition normally exists. Should the engine speed start to decrease below the predetermined idling speed the force exerted by the flyweight mechanism 23" is weakened allowing the idle spring 19" to move fuel control 16" in a direction which increases fuel injection thereby restoring the idling speed.

Referring now again to FIG. 4 in conjunction with FIG. 3, when the operator manipulates linkage 12" to increase engine speed above the idling rate, control element 16" seats against the end of member 18" which itself remains fixed by the strong force of spring 21". Thus at this stage, the rack 11" is controlled solely by the operator through linkage 12". As the rated speed is reached the force exerted by the flyweight mechanisms 23", in combination with the force of the torque spring 26", becomes sufficient to move member 18" against the force of spring 21" thereby establishing a maximum speed governing effect. If the engine speed attempts to increase above this point, the increasing force exerted by flyweight mechanisms 23" moves control element 16" against the force of spring 21" to decrease fuel injection.

If while operating at rated speed under full load, the engine lugs down due to an overload, the force exerted by the flyweight mechanism 23" is weakened allowing spring 21" to compress the torque spring 26". The resulting movement of control element 16" acts to increase fuel injection and thereby increases the torque output of the engine. Owing to this increasing torque as the engine lugs down, stalling is either averted or delayed sufficiently that the operator may take appropriate action to relieve the overload or downshift.

While the invention has been described with reference to the generalized basic structure of a maximum-minimum governor and with reference to one specific detailed example thereof, it will be apparent that the invention is applicable to diverse governors which may differ substantially in physical form. Accordingly, it is not intended to limit the invention except as defined in the following claims.

What is claimed is:
1. An engine governor of the class having a control element which may be moved to vary the quantity of fuel supplied to an associated engine and having a second movable member and an idle spring exerting a force between said control element and said second movable member which tends to move said control element to increase the fuel supply to said engine, said governor further having a maximum speed spring exerting a force on said second movable member which also tends to move said control element to increase the fuel supplied to said engine and having a fixed stop limiting movement of said second movable member in response to the force of said maximum speed spring and further having a flyweight mechanism applying a centrifugally generated force to said control element in opposition to the forces of said idle spring and said maximum speed spring, said governor further comprising:

a torque spring acting between said second movable member and said fixed stop and opposing travel of said second movable member toward said fixed stop.

2. An engine governor as defined in claim 1 wherein said torque spring is a compression spring situated between said second movable member and said fixed stop.

3. An engine governor as defined in claim 1 wherein said control element, said second movable member, said idle spring, said maximum speed spring and said fixed stop are annular and arranged in coaxial relationship, and wherein said second movable member has an outside diameter exceeding the inside diameter of said fixed stop, and wherein said torque spring is an annular Bellville spring disposed between said second movable member and said fixed stop in coaxial relationship therewith.

4. A maximum-minimum engine governor comprising a rotatable drive shaft turned by said engine, an annular fuel control element disposed coaxially on said drive shaft and being slidable therealong to regulate the quantity of fuel supplied to said engine, a flyweight mechanism mounted on said drive shaft and turned thereby and producing a force which is a function of the speed of said engine and which acts against said control element in a direction tending to decrease the quantity of fuel supplied to said engine, an annular second movable member disposed coaxially with respect to said drive shaft, an idle spring disposed within said second movable member and exerting a force between said second movable member and said control element in opposition to the force of said flyweight mechanism, a maximum speed spring disposed coaxially with respect to said drive shaft and exerting a force against said second movable member also in opposition to the force of said flyweight mechanism thereon, an annular fixed stop disposed coaxially with respect to said drive shaft and limiting travel of said second movable member in response to said force of said maximum speed spring, and an annular torque spring disposed in coaxial relationship to said stop and in contact therewith and in the path of said second movable member as said member moves in response to the force of said maximum speed spring.

References Cited

UNITED STATES PATENTS

| 2,259,693 | 10/1941 | Hogeman | 123—139 |
| 2,312,212 | 2/1943 | Edwards | 123—140 |
| 2,669,983 | 2/1954 | Reddy et al. | 123—140 |
| 2,717,587 | 9/1955 | Links et al. | 123—140 |
| 2,986,291 | 5/1961 | Schick | 123—140 |
| 3,289,661 | 12/1966 | May et al. | 123—139 |

WENDELL E. BURNS, Primary Examiner.

U.S. Cl. X.R.

123—112, 139; 137—18